A. N. SINCLAIR.
X-RAY FILM MOUNT.
APPLICATION FILED NOV. 17, 1921.
1,410,130.   Patented Mar. 21, 1922.
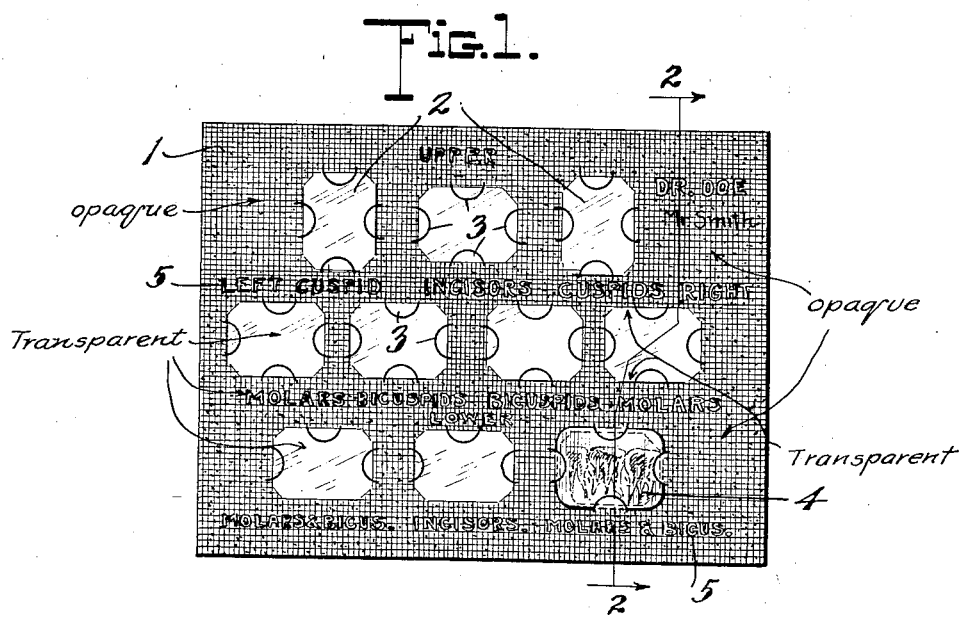
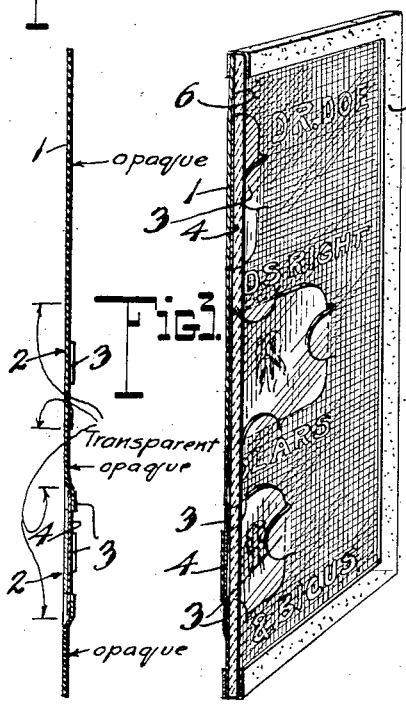

UNITED STATES PATENT OFFICE.

ARCHIBALD N. SINCLAIR, OF HONOLULU, TERRITORY OF HAWAII.

X-RAY-FILM MOUNT.

1,410,130.   Specification of Letters Patent.   Patented Mar. 21, 1922.

Application filed November 17, 1921. Serial No. 515,869.

*To all whom it may concern:*

Be it known that I, ARCHIBALD N. SINCLAIR, a citizen of the United States, residing at Honolulu, in the county of Honolulu and Territory of Hawaii, have invented a new and useful X-Ray-Film Mount, of which the following is a specification.

The present invention is an improved mount for X-ray films or radiographs and the method of producing the same, and while the invention herein disclosed is more particularly defined for use in connection with dental radiographs it is clear that the same is equally adaptable for general use in connection with X-ray films or radiographs of other portions of the body.

It is known that it has been proposed to mount X-ray films on a translucent body or card upon which certain indicia relating to the film or to the patient is printed in ordinary opaque ink or the like. This is objectionable, first, because the film is not properly framed and does not exclude the light immediately surrounding the film from the vision of the observer when the film is positioned for light to be transmitted therethrough for inspection, in the usual manner, and thereby prevents detailed features of the film from being emphasized without undue straining of the eyes; and, second, the indicia on the transparent cards is not emphasized and is somewhat drowned by the inflow of transmitted light surrounding the same because of the transparent nature of the card on which it is placed.

It is also known that it has been proposed to provide an opaque card with an opening therein before which the X-ray film is mounted, but this structure while framing the film and excluding the surrounding light weakens the mount, because of the opening therein and moreover exposes the film on both sides. It has been further proposed to place over an opening in the opaque card a translucent plate or window in order to protect one surface of the film, but obviously this does not overcome the inherent weakness of the mount due to the opening therein and only adds to the expenditure of manufacture.

It is the object of this invention to produce an X-ray film mount possessing such improved structure and features as will overcome all of the above noted drawbacks and at the same time one which can be produced at a minimum of cost when considering the complete and durable nature as well as the film protecting and preserving properties of the mount.

The film mount of this invention broadly consists of a substantially opaque plate or sheet of material having one or more translucent areas therein integral with the sheet before which the X-ray films or radiographs are arranged and maintained in position. A further feature of the invention is the provision of other translucent areas on the substantially opaque sheet in the form of indicia relating to the films thereon or to the patient, whereby the indicia may be readily brought before the vision of the inspector at a glance and in a pronounced manner by the light transmitted through the area forming the indicia. It is also a feature of the invention to provide a mount having the above mentioned features and wherein both faces of the X-ray film are protected against scratches, damage by water or moisture, or any other ordinary injury.

The invention further resides in the sundry details of construction, combination and arrangement of parts as well as the novel steps of the method therein disclosed for producing the mounts, all of which will be readily apparent from the following detailed description.

In this specification and the annexed drawings, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope thereof.

In the drawings illustrating the embodiment of the invention:

Figure 1 is a front elevation of a film mount of the invention in its broadest conception, Figure 2 is a vertical section of the film mount taken substantially on line 2—2 of Figure 1, Figure 3 is a fragmentary sectional view of a more complete embodiment of the invention, with parts in section to illustrate its detailed construction, and Figure 4 is a front elevation of the master sheet from which the mount may be produced.

Referring in detail to the drawings, wherein like characters of reference refer to similar and like parts throughout the several views, 1 denotes a film mount comprising a substantially opaque sheet of material, such as glass, mica, celluloid or the like having one or more integral translucent areas 2 therein. These translucent areas 2 may be of any desired shape or form corresponding to the type or style of X-ray film to be used on the mount, and if there are a number of these areas 2 they may be arranged in any desired order which will best suit the purposes and needs required.

Suitable means 3 are employed for maintaining an X-ray film before the translucent areas 2 of the mount 1, these means being here shown in the form of spring tongues 3 formed by arcuate slits in the mount each adjacent the translucent areas 2. These tongues 3 are resilient and can be sprung by reason of the nature of the material of which they are made. The films 4 are inserted between the tongues and the body portion of the translucent areas 2 and are thus maintained in position on the mount 1 before said areas. As shown, portions of the tongues extend into the translucent areas, but these portions are translucent in order to permit light to be transmitted therethrough.

The opaque sheet 1 is further provided with illuminative memoranda produced by additional translucent areas 5 integral therewith and assuming the outline of indicia giving certain information regarding the film arranged before the respective areas 2 or any other desired information concerning the patient. This indicia may be arranged under, above or adjacent each translucent area 2 and becomes illuminated together with the film by light in back of the mount 1. Thus, the film and indicia can be inspected at the same time, this being of great advantage in X-ray studios where the room or inspecting booth is relatively dark and a strong light is transmitted through the side of the film opposite the observer.

By having the translucent areas 2 integral with the sheet 1, the film mount thus provided is devoid of any openings or cut out portions which tend to weaken the structure and are liable to be caught on projections or obstructions causing the same to tear.

The translucent areas 2 also provide a protecting cover for one surface of the films. But, to further protect the films 4 and to give the mount a rigid or stiff character for filing or for such other purposes as may be desired, a sheet of transparent material 6 of substantially the same area as the mount 1, is laid over the sheet 1 on the side thereof carrying the X-ray films 4. These sheets 1 and 6 may be held together in any desired manner, but in the present instance a cheap and economical means is shown, such as a marginal binding 7 of adhesive tape, see Figure 3.

Of course, it is to be understood that the translucent character of the sheet 6 does not in any way hinder the transmission of light through the mount 1, and the sheet 6 may be omitted in practicing this invention if desired.

The sheet 1 may be produced from a master sheet 8 (Fig. 4) of translucent material having opaque portions 9. This master sheet 8 also carries the desired indicia 10 written or printed thereon with opaque ink or other suitable material. A suitable sensitized sheet is then arranged in suitable relation with the master sheet in order to be photographed or printed upon by photographic means from the master sheet so as to produce the substantially opaque sheet 1 with translucent areas 2 and 5 thereon. Of course, this invention is not limited to this specific method of producing the sheet 1 because the same may be produced by ordinary contact printing and without the use of a sensitized sheet.

From the foregoing it is seen that an X-ray mount is provided of opaque material with an integral translucent area or areas before which film may be placed, in contradistinction to the openings which weaken the mount, the translucent areas 2 together with the transparent plate 6 providing protecting cover for the surfaces of the film. It is also clear that the indicia 5, formed by translucent areas on the opaque mount 1, as well as the film, will be illuminated, when intercepted between a source of light and the observer, and brought sharply to the vision by reason of the surrounding light being excluded by the opaque nature of the body of the mount 1. Thus a relatively inexpensive mount is provided having numerous advantages in construction, durability and convenience not possessed by other known X-ray film mounts.

Having thus described my invention in the forms at present devised what is claimed as new and upon which Letters Patent are prayed, is:

1. A film mount comprising a sheet of substantially opaque material having a translucent area thereon integral with the sheet, said translucent area being adapted to have a film arranged to register therewith on one side of the sheet, and means for maintaining the film in position before said translucent area.

2. A film mount comprising a sheet of substantially opaque material having a translucent area thereon integral with the sheet, said translucent area being adapted to have a film arranged to register therewith on one side of the sheet, and means on the sheet contiguous to the edge of said translucent area for maintaining the film in position on the sheet.

3. A film mount comprising a sheet of substantially opaque material having a translucent area thereon integral with the sheet, said translucent area being adapted to have a film arranged to register therewith on one side of the sheet, said sheet being slit at points contiguous to said translucent area to form resilient tongues, between which latter and the translucent area the edges of the film may be inserted to maintain the film in position before said translucent area.

4. A film mount comprising a sheet of substantially opaque material having a translucent area thereon, said translucent area being adapted to have a film arranged to register therewith on one side of the sheet, means for maintaining the film in position before said translucent area, and translucent indicia on said opaque sheet relating to the film before said translucent area.

5. A film mount comprising a sheet of substantially opaque material having a translucent area thereon integral with the sheet, said translucent area being adapted to have a film arranged to register therewith on one side of the sheet, means for maintaining the film in position before said translucent area, said opaque sheet having another translucent area forming indicia adjacent the first translucent area relating to the film before said first area.

6. A film mount comprising a sheet of substantially opaque material having a translucent area thereon integral with the sheet, said translucent area being adapted to have a film arranged to register therewith on one side of the sheet, and a transparent plate or sheet of material covering said opaque sheet and said film, and means for maintaining said opaque and transparent sheets together.

7. A film mount of the character described comprising a sheet of substantially opaque material having a translucent area thereon integral with the sheet, a transparent sheet of material arranged in contacting relation on one side of said opaque sheet, said sheets being adapted to have a picture film interposed therebetween and before the translucent area on the opaque sheet, and means for binding said sheets together.

8. A film mount of the character described comprising a sheet of substantially opaque material having a translucent area thereon integral with the sheet, a transparent sheet of rigid material arranged in contacting relation on one side of said opaque sheet and coextensive therewith, said sheets being adapted to have a picture film interposed therebetween and before the translucent area on the opaque sheet, whereby the film is protected on one face by said transparent sheet, means for maintaining the films in position before said translucent area, and means for binding the edges of said sheets together.

9. A radiograph film mount of the character described comprising a sheet of substantially opaque material having a plurality of translucent areas thereon integral with the sheet, slits in said sheet adjacent said areas forming resilient tongues, said sheet being adapted to have films positioned before said translucent areas thereon and inserted between said tongues and said areas, whereby the films are maintained in position, said sheet having other translucent areas thereon forming indicia, a transparent sheet substantially coextensive with said opaque sheet and covering said films, and means for maintaining said sheets together.

10. A film mount of the kind described comprising an integral sheet of translucent material having a coating thereon to form substantially opaque portions and integral translucent portions, said translucent portions being adapted to have picture films arranged therebefore, and means for maintaining said films in position on the sheet.

In testimony whereof, I have hereunto set my hand, this 17 day of October 1921.

ARCHIBALD N. SINCLAIR.